United States Patent [19]
Huilgol et al.

[11] Patent Number: 5,708,561
[45] Date of Patent: Jan. 13, 1998

[54] PORTABLE COMPUTER HAVING DISPLAY SLIDABLY AND ROTATABLY MOUNTED FOR MOVEMENT BETWEEN LANDSCAPE AND PORTRAIT ORIENTATION AND TO OPEN AND CLOSE SPEAKER PORTS

[75] Inventors: Vivek R. Huilgol; Graziella E. Stocco, both of 626 E. State St., Apt. 808, Milwaukee, Wis. 53202; Henry M. Anderson, Jr., Belding, Mich.; Christopher C. Gielow, Mequon, Wis.

[73] Assignees: Vivek R. Huilgol; Graziella E. Stocco, both of Milwaukee, Wis.

[21] Appl. No.: 696,056

[22] Filed: Aug. 13, 1996

[51] Int. Cl.⁶ .................................................... G06F 1/16
[52] U.S. Cl. .................................................... 361/681
[58] Field of Search ........................ 364/708.1; 345/905; 248/919–923; 361/681

[56] References Cited

U.S. PATENT DOCUMENTS

| | | | |
|---|---|---|---|
| D. 322,063 | 12/1991 | Oyama | D14/113 |
| 4,267,555 | 5/1981 | Boyd et al. | 345/126 X |
| 4,542,377 | 9/1985 | Hagen et al. | 345/126 |
| 4,731,030 | 3/1988 | Johnston . | |
| 5,016,849 | 5/1991 | Wu . | |
| 5,024,415 | 6/1991 | Purens . | |
| 5,128,662 | 7/1992 | Failla . | |
| 5,206,790 | 4/1993 | Thomas et al. . | |
| 5,329,289 | 7/1994 | Sakamoto et al. . | |
| 5,335,142 | 8/1994 | Anderson . | |
| 5,347,630 | 9/1994 | Ishizawa et al. | 361/681 X |
| 5,432,720 | 7/1995 | Lucente et al. | 364/708.1 |
| 5,434,964 | 7/1995 | Moss et al. . | |
| 5,629,833 | 5/1997 | Ido et al. | 361/681 |

FOREIGN PATENT DOCUMENTS

| | | | |
|---|---|---|---|
| 703401 | 3/1996 | European Pat. Off. | G06F 1/16 |
| 4-58725 | 5/1992 | Japan | G06F 1/16 |
| 8-63259 | 3/1996 | Japan | G06F 1/16 |

*Primary Examiner*—Michael W. Phillips
*Attorney, Agent, or Firm*—Andrus, Sceales, Starke & Sawall

[57] ABSTRACT

A portable computer includes a base and a cover incorporating a display screen pivotably mounted to the base between a closed position overlying the base and an open position raised over the base. A swivel arrangement is located in the cover enabling at a least a portion of the cover and the display screen to be rotatable about an axis which is perpendicular to the cover in the open position, and between a landscape orientation in which the display screen has a longer dimension extending in a substantially horizontal direction and a portrait orientation in which the display screen has a shorter dimension extending in a substantially horizontal direction. The cover is also mounted for sliding movement. Front speaker ports are opened and closed when the cover moves. A recessed corner segment is provided on the cover for easier manipulation of the cover.

12 Claims, 4 Drawing Sheets

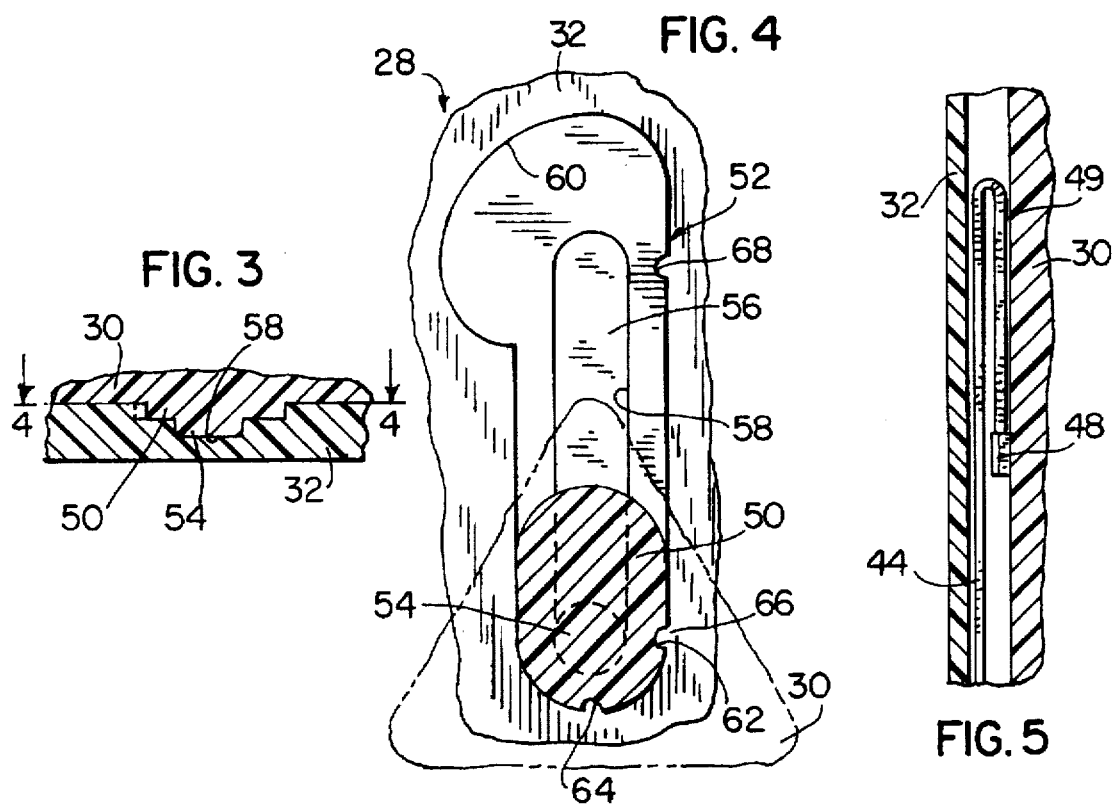
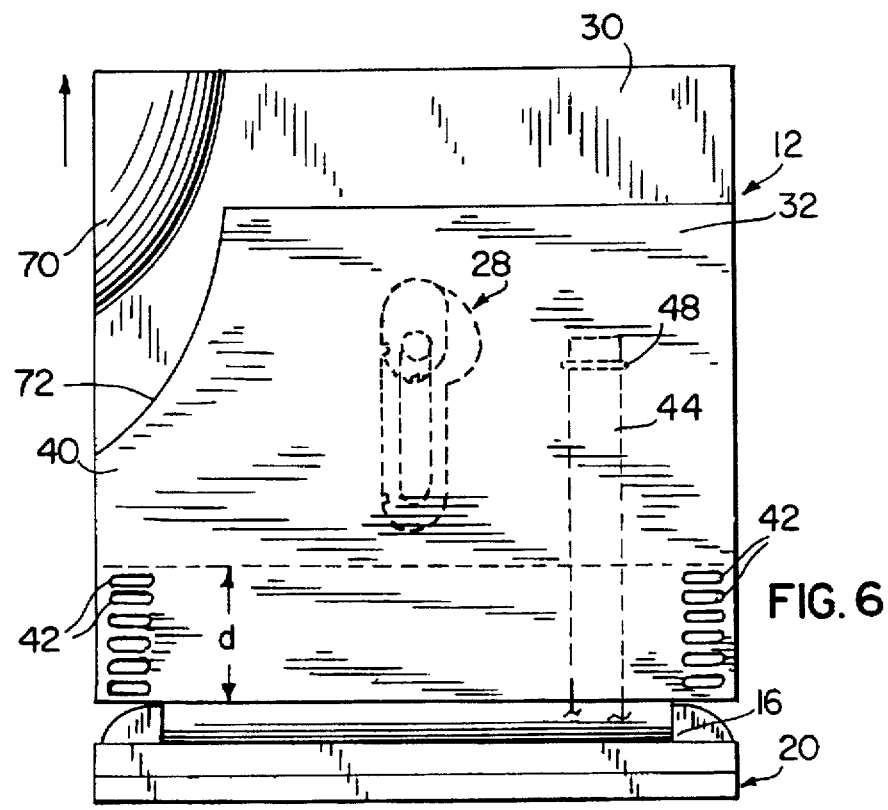

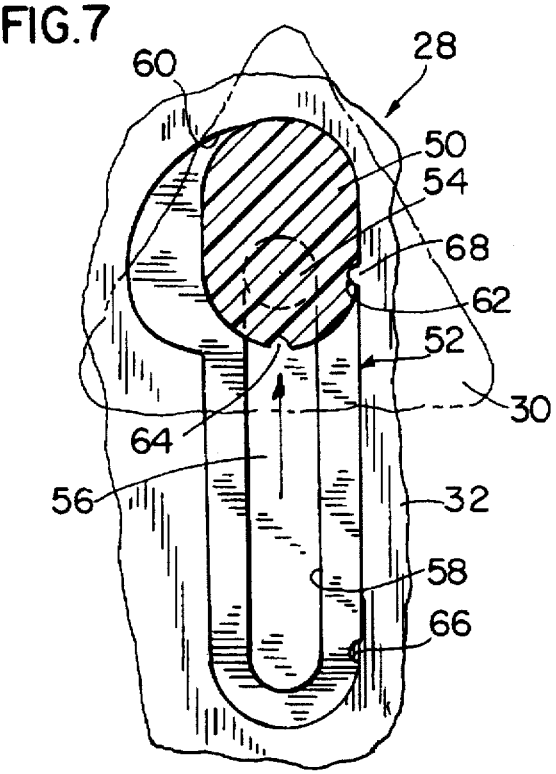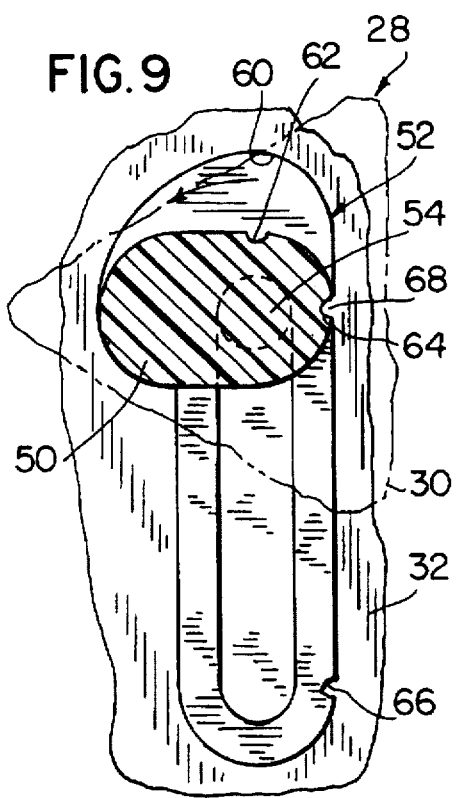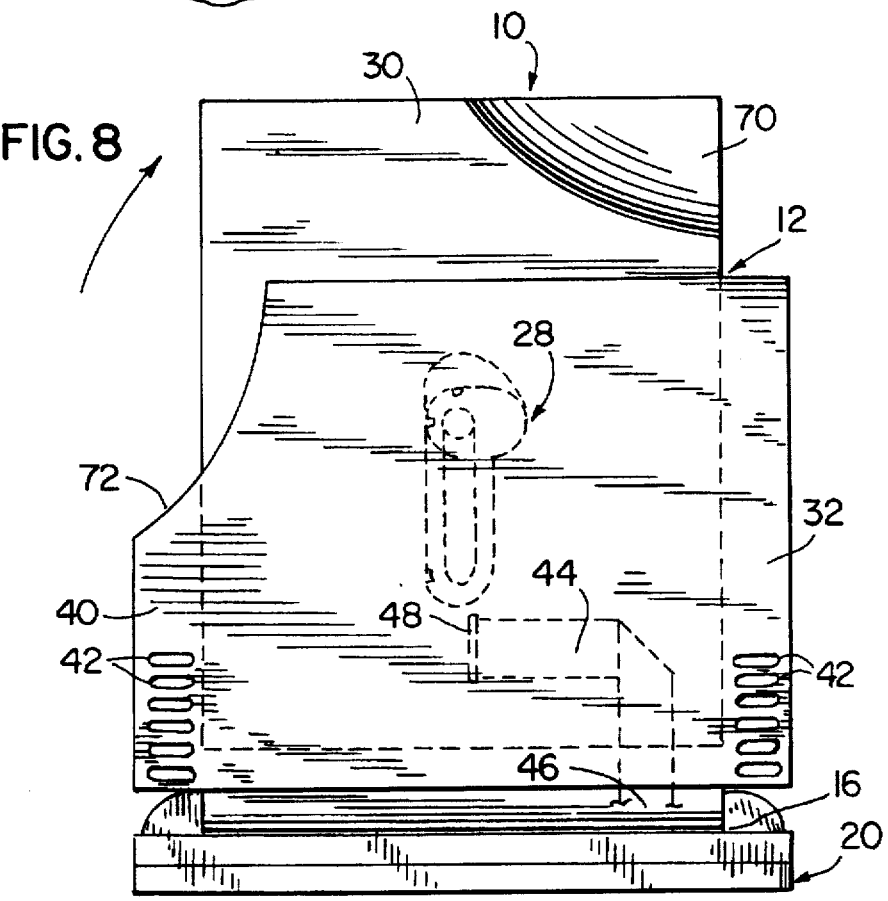

PORTABLE COMPUTER HAVING DISPLAY SLIDABLY AND ROTATABLY MOUNTED FOR MOVEMENT BETWEEN LANDSCAPE AND PORTRAIT ORIENTATION AND TO OPEN AND CLOSE SPEAKER PORTS

FIELD OF THE INVENTION

This invention relates broadly to portable computers having a movable display screen and, more particularly, pertains to a laptop computer having a display screen which is rotatable between a landscape orientation in which the display screen has a longer dimension in a horizontal direction, and a portrait orientation in which the display screen has a longer dimension in the vertical direction.

BACKGROUND AND SUMMARY OF THE INVENTION

In recent years, attempts have been made to provide non-portable, desktop-type computers with monitors or video display screens which can be pivoted to either a horizontally elongated, landscape orientation or a vertically elongated, portrait orientation for the purpose of accommodating variously-sized text and graphics formats. For example, U.S. Pat. No. 4,267,555 discloses a rotatable raster scan display employing a thrust bearing for rotatably mounting a CRT to a control cabinet. U.S. Pat. No. 4,542,377 also discloses a rotatable work display station in which the CRT is swingable about a rear control housing. Yet a further showing of a desk-type computer having a rotatable display supported on a fixing element is set forth in U.S. Pat. No. 5,329,289.

There have also been efforts to provide portable pen-based or hand held computers wherein the entire computer housing and integral display screen may be rotated in 90° increments as described in U.S. Pat. Nos. 5,100,098 and 5,432,720.

However, while the aforementioned desktop-type and pen-based portable computers have recognized the advantages of providing a rotatable display screen to optimize display capability, it has been discovered that such a desirable feature had not been developed for laptop computers. This is due in great part to the inherent construction of a laptop computer which is generally comprised of a cover incorporating a display screen which is pivotally mounted to a base about a horizontal axis. Because the cover is typically of a rectangular configuration of the same size as its base, the prior art has been limited in attempting to enhance the capability of the display screen. For instance, U.S. Pat. Nos. 5,016,849, 5,206,790 and 5,335,142 all relate to swivel/tilt mechanisms to enable a laptop monitor to pivot upwardly and downwardly with respect to a horizontal axis, and swing left to right about a vertical axis perpendicular to the base so as to widen the visual range and increase the working efficiency of the computer. Another direction has been taken in U.S. Pat. No. 5,128,662 which provides a collapsibly segmented screen to augment the visibility of the display.

Regardless of the current size or expanded sizes of laptop computers about to be introduced, it remains extremely desirable to provide a portable laptop computer having a display screen which is easily changeable from a landscape orientation to a portrait orientation. Such adaptability is intended to override the current limitations in screen size owing to portability of the laptop computer. It is also important to provide a rotating laptop computer display which will not increase the storage and transport volume of the laptops currently available.

Accordingly, it is a principal object of the invention to provide an improved display screen for use with a portable computer.

It is also a primary object of the invention to provide a laptop computer having a base and a cover with an integral display screen which is pivotable about a horizontal axis, and is rotatable about an axis perpendicular to the display screen when the cover is in a raised position relative to its base.

It is a further object of the invention to provide a swivel arrangement in the cover of a laptop computer which will translate linear movement of a display screen into a rotational movement so that the laptop computer can be adjusted between at least two orientations.

It is another object of the invention to provide a relatively simple cam and detent arrangement used in changing the disposition of a display screen in a laptop computer.

It is yet another object of the invention to provide a movable display screen, the position of which affects the sound characteristics of a multi-media laptop computer.

Still another object of the invention is to provide a laptop computer having a display screen slidable and rotatable with respect to the base in a manner which will not jeopardize the electrical connection between the base and the cover.

Moreover, another object of the invention is to provide a laptop computer having a cover which is easily manipulated to move a display screen among several operating positions.

It is also a related object of the invention to provide a method of changing the disposition of a laptop computer display screen.

The present invention advantageously provides a laptop computer display screen exhibiting an enhanced amount of information capability without necessarily expanding the physical dimensions of the base and cover of the laptop computer. The resulting rotational display screen increases the versatility and displayability of the information of many laptop computer applications including word processing, spreadsheet operations, graphics applications, Internet documents and program writing.

The above and other objects of the invention are realized in one aspect of the invention in which a portable computer comprises a base and a cover incorporating a display screen pivotably mounted to the base, the display screen having a longer dimension and a shorter dimension. A swivel arrangement is located in the cover enabling at least a portion of the cover and the display screen to be movable relative to the base between at least two orientations, one having the longer dimension in a horizontal orientation and one having the longer dimension in a vertical orientation. The base includes a keyboard and a control processing unit. The cover includes a first portion incorporating the display screen, and a second portion provided with speakers and pivotally secured to the base, the first portion being movably mounted to the second portion. The second portion of the cover includes a front wall formed with front speaker ports in communication with the speakers, and a back wall formed with back speaker ports in communication with the speakers. The front speaker ports are selectively opened and closed depending on the position of the first portion of the cover relative to the second portion of the cover. A connecting wire ribbon extends between the base and the cover, the ribbon lying between the first portion of the cover and the second portion of the cover. The display screen is movable between a first position and a second position while maintaining the one orientation having the longer dimension in the horizontal direction.

In another aspect of the invention, a portable computer comprises a base and a cover incorporating a display screen pivotally mounted to the base between a closed position overlying the base and an open position raised over the base. A swivel arrangement is located in the cover enabling at least a portion of the cover and the display screen to be rotatable about an axis which is perpendicular to the cover in its open position. The cover and the display screen are further rotatable between a landscape orientation in which the display screen has a longer dimension extending in a substantially horizontal direction, and a portrait orientation in which the display screen has a shorter dimension extending in a substantially horizontal direction.

In yet another aspect of the invention, a portable computer comprises a base and a cover movably mounted to the base between a closed position overlying the base and an open position raised over the base. The cover includes a first portion incorporating a display screen and a second portion pivotably mounted to the base. A swivel arrangement is located in the cover enabling the first portion of the cover carrying the display screen to be slidable over a linear path and rotatable relative to the second portion of the cover. The first portion of the cover includes a cam element fixed thereto and the second portion of the cover includes a cam track cooperable with the cam element. The cam element is an, elliptically-shaped member having a shaft projecting substantially perpendicularly therefrom. The cam track comprises an inner path formed by a continuous wall defining an elongated slot in which the shaft is slidably captured, and an outer path engageable with the periphery of the elliptically-shaped member. The cam element is provided with a pair of spaced detent notches about its periphery, and the cam track is formed with a pair of spaced detents, one of the detents being selectably engageable with one of the detent notches. One of the detents is engageable with one of the detent notches to define a first position of the display screen, the other of the detents is engageable with the other of the detent notches to define a second position of the display screen and the other of the detents is engageable with the one of the detent notches to define a third position of the display screen. The second portion of the cover includes a recessed corner segment enabling easier manipulation of the first portion of the cover. A connecting wire ribbon has one end connected to the base and another end connected to the first portion of the cover, there being a slack portion between the ends.

In yet another aspect of the invention, in a portable computer having a base and a cover incorporating a display screen pivotably mounted to the base between a closed position overlying the base and an open position raised over the base, a method for changing the disposition of the display screen between a landscape orientation in which the display screen has a longer dimension extending in a substantially horizontal direction, and a portrait orientation in which the display screen has a shorter dimension extending in a substantially horizontal direction. The method comprises the steps of providing the cover with a first portion incorporating the display screen and a second portion pivotally mounted to the base; providing a swivel arrangement in cover enabling the first portion of the cover and the display screen to be rotatable relative to the second portion of the cover about an axis perpendicular to the cover in the open position; and rotating the first portion of the cover and the display screen about the perpendicular axis between the landscape orientation and the portrait orientation. The step of providing a swivel arrangement in the cover includes enabling the first portion of the cover and the display screen to be slidable relative to the second portion in a plane parallel to the second portion of the cover in the open position. The method includes the step of sliding the first portion of the cover and the display screen relative to the second portion of the cover between the landscape orientation and the portrait orientation. The method also includes the step of providing speakers and speaker ports in the second portion of the cover. The step of sliding the first portion of the cover and the display screen relative to the second portion of the cover selectively covers and uncovers the speaker ports.

In yet a further aspect of the invention, a portable computer comprises a base and a cover movably mounted to the base between a closed position overlying the base and an open position raised over the base. The cover includes a first portion incorporating a display screen and a second portion pivotally mounted to the base. A cam means located internally within the cover and connecting the first portion of the cover and the second portion of the cover is used for translating a linear movement of the first portion of the cover into a rotational movement of the first portion of the cover relative to the second portion of the cover thereby reorienting the position of the display screen.

Various other objects, features and advantages of the invention will be made apparent from the following description taken together with the drawings.

BRIEF DESCRIPTION OF THE DRAWINGS

The drawings illustrate the best mode presently contemplated of carrying out the invention. In the drawings:

FIG. 3 is an enlarged cross-sectional view taken on line 3—3 of FIG. 2;

FIG. 4 is an enlarged detail view, partially in cross-section, taken on line 4—4 of FIG. 3, and illustrating a cam element and a cam track constituting the internal swivel arrangement;

FIG. 5 is an enlarged cross-sectional view taken on line 5—5 of FIG. 2;

FIG. 6 is a view similar to FIG. 2 depicting the raising of the display screen to a multi-media position;

FIG. 7 is an enlarged detail view partially in cross-section similar to FIG. 4, but depicting the internal swivel arrangement in the position shown in FIG. 6;

FIG. 8 is a view similar to FIG. 6 depicting the swiveling of the display screen to a portrait orientation;

FIG. 9 is an enlarged detail view partially in cross-section similar to FIG. 7, but depicting the internal swivel arrangement shown in FIG. 8.

DETAILED DESCRIPTION OF THE PREFERRED EMBODIMENT

Figure 1:
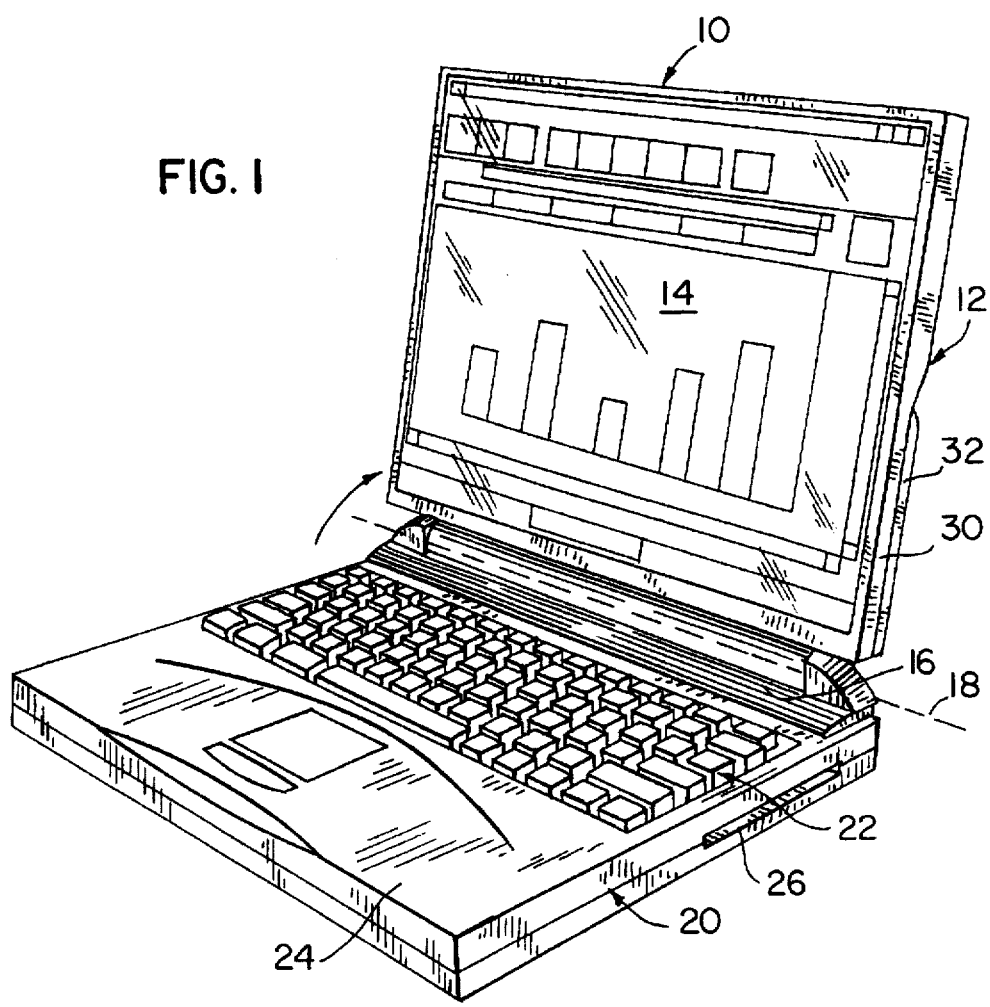
FIG. 1 is a perspective view of a portable computer having a display screen equipped with an internal swivel arrangement embodying the present invention and disposed in a landscape orientation.
Figure 2:
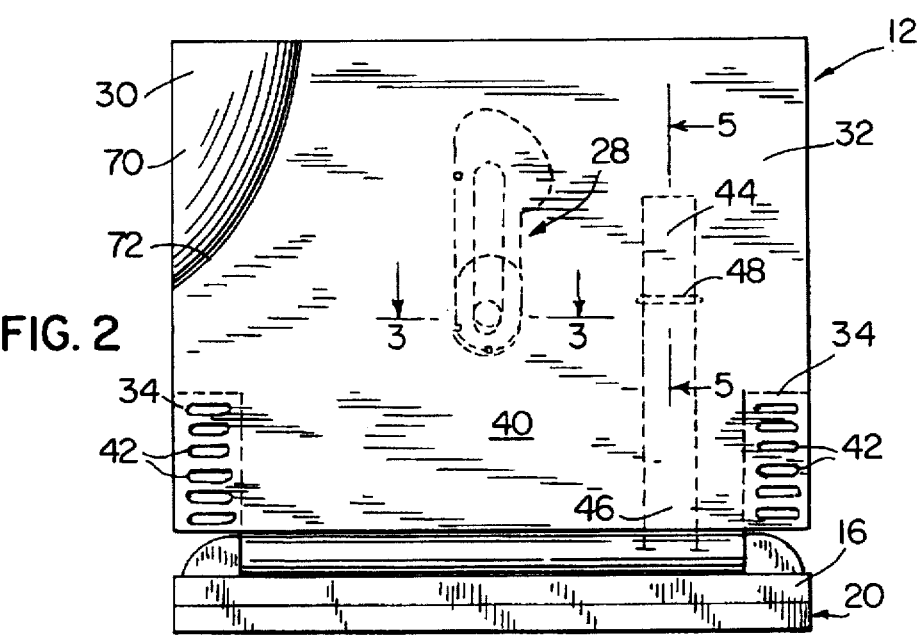
FIG. 2 is a rear view of the portable computer shown in FIG. 1 showing the internal swivel arrangement and a connecting wire ribbon in phantom, the display screen being in its lowermost position.

Referring now to FIGS. 1 and 2, a portable laptop computer embodying the present invention is generally identified by the reference numeral 10. Laptop computer 10 is illustrated with a cover 12 incorporating a monitor or display screen 14 which is pivotally connected by a conventional hinge mechanism 16 about a horizontal axis 18 to a base 20. Cover 12 is shown by the directional arrow as being pivoted upwardly from a closed, locked position directly overlying base 20 to an open position raised over and apart from base 20 as is well understood in the use of laptop computers. Base 20 typically includes a central processing unit or CPU (not shown) and a keyboard 22 for inputting data to be processed via CPU and visually displayed on display screen 14. Base 20 also typically includes a flat forepanel 24 provided with a track ball or the like, and may be split to house a CD-ROM drive so as to provide multi-media capability for laptop computer 10. The side of base 20 may include a floppy disk access port 26 while hinge mechanism 16 at the rear of base 20 generally includes the necessary electrical connections linking base 20 with display screen 14 and cover 12. As is the case with most laptop computers, cover 12 and base 20 have similar respective lengths and widths so as to form a generally rectangular portable package. Display screen 14 also has a substantially rectangular configuration and is slightly smaller than the dimension of cover 12 into which it is seated. A typical diagonal measurement of display screen 14 falls in the 10—13 inch range.

Figure 10:
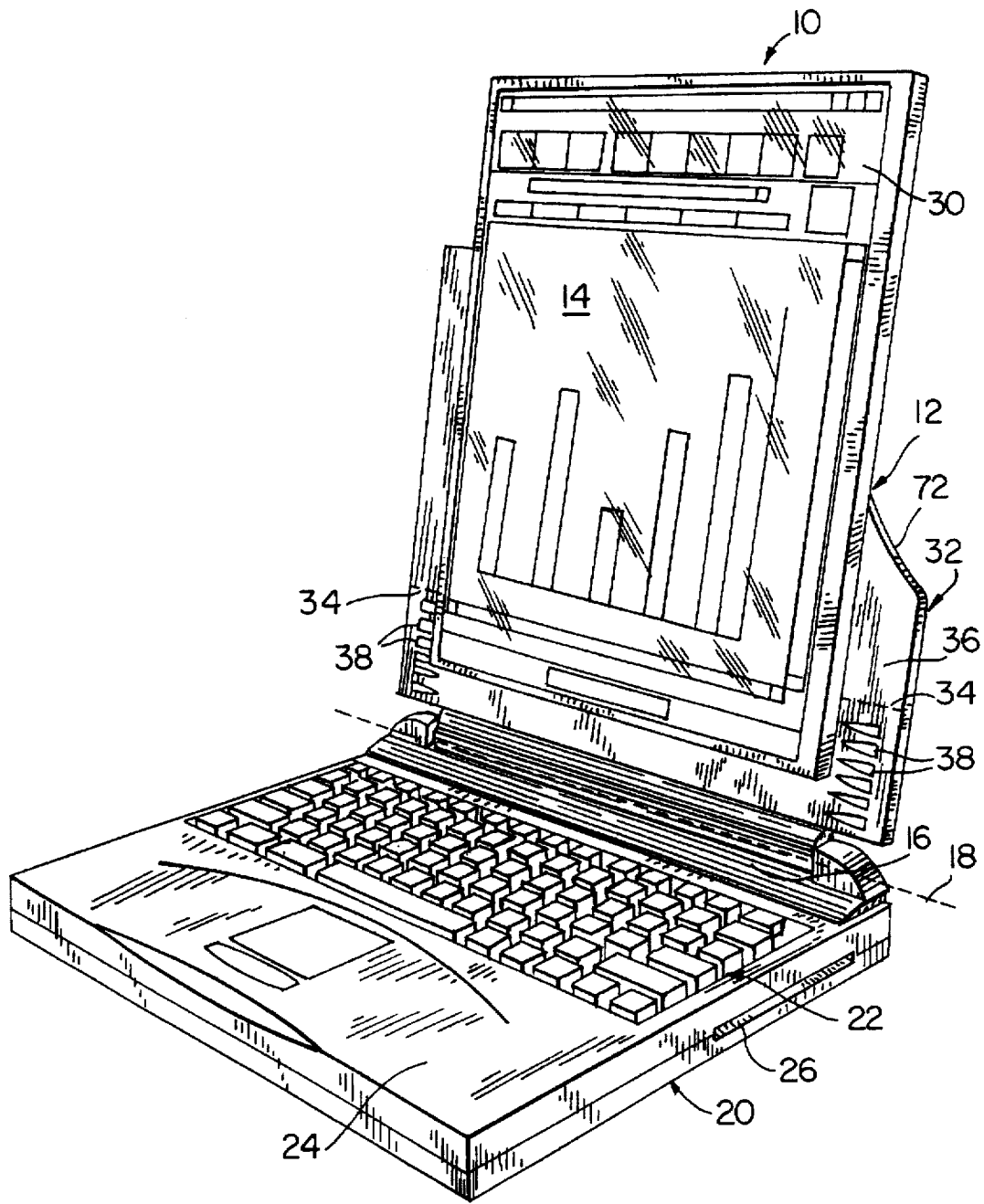
FIG. 10 is a view similar to FIG. 1, but showing the display screen rotated 90° to a portrait orientation.

According to the invention, a swivel arrangement 28 (FIG. 2) in the form of a cam assembly is located internally within cover 12 enabling at least a portion of cover 12 and display screen 14 to be movable relative to base 20 between at least two orientations. One of these orientations has a longer dimension in the horizontal direction and is known as a landscape orientation such as depicted in FIG. 1. The other of these orientations has a longer dimension in the vertical direction and is known as a portrait orientation such as shown in FIG. 10.

Cover 12 is comprised of a first forward facing portion 30 which carries display screen 14. Cover 12 further comprises a second or rearward facing portion 32 which is pivotally connected by hinge mechanism 16 to base 20, and is equipped with a pair of laterally disposed speakers 34 for providing sound effects. First cover portion 30 and second cover portion 32 are generally parallel to one another with first cover portion 30 constructed and arranged to be movable relative to second cover portion 32 and base 20 as will be appreciated hereafter. As seen in FIGS. 2, 6, 8 and 10, second cover portion 32 has a front wall 36 formed with front speaker ports 38 in communication with speakers 34, and a back wall 40 formed with back speaker ports 42 also in communication with speakers 34. Back speaker ports 42 are always in an open or uncovered position as contrasted with front speaker ports 38 which are selectively opened or closed depending on the position of first cover portion 30 relative to second cover portion 32. A flat, flexible connecting wire ribbon 44 extends between base 20 and cover 12 and functions to electrically connect the processing components in base 20 with the display screen in cover 12. More particularly, wire ribbon 44 has one end 46 connected to base 20 and another end 48 which lies between front cover portion 30 and second cover portion 32, and is fixed to first cover portion 32 for movement therewith. As seen in FIG. 5, wire ribbon 44 is provided with slack 49 sufficient to accommodate for the relative movement between first cover portion 30 and second cover portion 32.

Such relative movement is made possible by swivel arrangement 28 defined by a generally elliptically-shaped cam element 50 integrally formed on first cover portion 30 and cooperating in a cam track 52 cut into second cover portion 32. Referring to FIG. 3, cam element 50 has a short stub shaft 54 projecting perpendicularly therefrom which is slidably captured in an elongated slot 56 defining an inner path formed by a continuous wall 58 on second cover portion 32. Cam track 52 also includes an outer path 60 which is engageable with the periphery of elliptically-shaped element 50. With reference to FIGS. 4, 7 and 9, cam element 50 is provided with a pair of spaced detent notches 62, 64 about its periphery while outer path of cam track 52 is formed with a pair of spaced detents 66, 68. Detent 66 is engageable with detent notch 62 while detent 68 is separately engageable with detent notches 62, 64. It should be understood that these detents are preferably conventional spring-biased balls or the like, the details of which do not form a critical part of the invention. Detents 66, 68 define various positions of movement of cam element 50 relative to cam track 52 and may be disengaged by selective manual pressure on first cover portion 30 and its connected cam element 50 relative to cam track 52 formed in second cover portion 32. With this arrangement, detent 66 is selectively engageable with detent notch 62 (FIG. 4) to define a first position of display screen 14. Detent 68 is selectively engageable with detent notch 62 (FIG. 7) to define a second position of display screen 14. Detent 68 is selectively engageable with detent notch 64 (FIG. 9) to define a third position of display screen 14. As shown in FIG. 6, one of the upper corners of first cover portion 30 is formed with a textured hand grip surface 70 made accessible by forming an arcuate recess 72 in the same corner of second cover portion 32.

In use, cover 12, by virtue of second cover portion 32 being pivotally connected to base 20, is raised upwardly along with first cover portion 30 and display screen 14 mounted thereto as shown in FIGS. 1 and 2. First cover portion 30 and display screen 14 are maintained by detent 66 and detent notch 62 (FIG. 4) in substantial registry with second cover portion 32 in a first or lowermost position corresponding to a landscape orientation in which display screen 14 has a longer dimension in a horizontal direction. Grasping the textured hand grip surface 70, first cover portion 30 and display screen 14 are slidably pulled upwardly via a linear path, as shown by the arrow in FIGS. 6 and 7, overcoming the force of detent 66 so as to move cam element 50 upwardly until detent 68 engages detent notch 62. This movement results in first cover portion 30 and display screen 14 being placed in a second or multi-media position in which front speaker ports 38 are advantageously opened or uncovered to augment the quality of sound being delivered through back speaker ports 42. As first cover portion 30 and display screen 14 are moved upwardly into the second position, it should be understood that the end 48 of wire ribbon 44 simultaneously moves upward due to the slack portion 49 provided therein between cover portions 30, 32. It should also be noted that the display screen 14 maintains the landscape orientation in the second or multi-media position. However, when it becomes desirable or necessary to change the orientation of the information being displayed, one again grasps the textured hand grip 70 and rotates first cover portion 30 and display screen 14 90° about an axis perpendicular to cover 12 in its open position. In doing so, detent 68 is disengaged from detent notch 62 as the periphery of cam element 50 is urged along an eccentric portion or curved path 60 of cam track 52 as depicted in FIGS. 8 and 9. Ultimately, detent 68 engages with detent notch 64 to define a third position of display screen 14 corresponding to the portrait orientation shown in FIG. 10 in which a shorter dimension of display screen 14 extends in a horizontal position. Again, it should be noted that wire ribbon 44 owing to its flat construction follows the movement of first cover portion 30 and display screen 14 and assumes the bent over configuration shown in FIG. 8. In keeping with the invention, the second or multi-media position is set at a distance d (FIG. 6) which will allow clearance between the bottom left corner of first cover portion 30 and base 20 as the first cover portion 30 and display screen 14 are rotated 90°.

It should be readily apparent to those skilled in the art that the present invention provides a portable laptop computer with a swivel arrangement located internally within a cover and connecting a first cover portion with a second cover portion. The swivel arrangement takes the form of a cam assembly translating a linear movement of a first cover portion and a display screen into a limited rotational movement of the display screen relative to a second cover portion thereby moving the display screen between at least a landscape orientation and a portrait orientation. The laptop computer thus allows a pivotal movement of a display screen along a horizontal axis as well as rotational movement about an axis perpendicular to the cover in its open position. The laptop computer display is thereby enhanced in a manner which does not add to the length and width dimensions of the computer. Unlike prior art laptop computers which have been confined to swiveling the display screen from left to right about a vertical axis orthogonal to the base to widen the visual range, the present invention markedly increases the working efficiency of the computer.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with following claims.

We claim:

1. A portable computer comprising:
   a base;
   a cover incorporating a display screen pivotably mounted to said base, said display screen having a longer dimension and a shorter dimension; and
   a swivel arrangement located in said cover enabling at least a portion of said cover and said display screen to be movable relative to said base between at least two orientations, one having said longer dimension in a horizontal orientation and one having said longer dimension in a vertical orientation;
   wherein said cover includes a first portion incorporating said display screen, and a second portion provided with speakers and pivotally secured to said base, said first portion being movably mounted to said second portion:
   wherein said second portion of said cover includes a front wall formed with front speaker ports in communication with said speakers and a back wall formed with back speaker ports in communication with said speakers; and
   wherein said front speaker ports are selectively opened and closed depending on the position of said first portion of said cover relative to said second portion of said cover.

2. The portable computer of claim 1, wherein said base includes a keyboard and a control processing unit.

3. The portable computer of claim 1, including a connecting wire ribbon extending between said base and said cover, said connecting ribbon lying between said first portion of said cover and said second portion of said cover.

4. The portable computer of claim 1, wherein said display screen is movable between a first position and a second position while maintaining said one orientation having said longer dimension in said horizontal direction.

5. A portable computer comprising:
   a base;
   a cover movably mounted to said base between a closed position overlying said base and an open position raised over said base, said cover including a first portion incorporating a display screen and a second portion pivotably mounted to said base;, and
   a swivel arrangement located in said cover enabling said first portion of said cover carrying said display screen to be slidable over a linear path and rotatable relative to said second portion of said cover;
   wherein said second portion of said cover includes a recessed corner segment enabling easier manipulation of said first portion of said cover.

6. The portable computer of claim 5, wherein said first portion of said cover includes a cam element fixed thereto and said second portion of said cover includes a cam track cooperable with said cam element.

7. The portable computer of claim 6, wherein said cam element is an elliptically shaped member having a shaft projecting substantially perpendicularly therefrom.

8. The portable computer of claim 7, wherein said cam track comprises an inner path formed by a continuous wall defining an elongated slot in which said shaft is slidably is slidably captured, and an outer path engageable with the periphery of said elliptically shaped member.

9. The portable computer of claim 6, wherein said cam element is provided with a pair of spaced detent notches about its periphery, and said cam track is formed with a pair of spaced detents, one of said detents being selectively engageable with one of said detent notches.

10. The portable computer of claim 9, wherein one said detents is engageable with one of said detent notches to define a first position of said display screen, the other of said detents is engageable with the other of said detent notches to define a second position of said display screen and said other of said detents is engageable with said one of said detent notches to detent a third position of said display screen.

11. The portable computer of claim 5, including a connecting wire ribbon having one end connected to said base and another end connected to said first portion of said cover, there being a slack portion between said ends.

12. In a portable computer having a base, a cover incorporating a display screen pivotably mounted to said base between a closed position overlying said base and an open position raised over said base, a method for changing the disposition of said display screen between a landscape orientation in which said display screen has a longer dimension extending in a substantially horizontal direction and a portrait orientation in which said display screen has a shorter dimension extending in a substantially horizontal direction, the method comprising the steps of:
   a) providing said cover with a first portion incorporating said display screen and a second portion mounted to said base;
   b) providing speakers and ports in said second portion of said cover:
   c) providing a swivel arrangement in said cover enabling said first portion of said cover and said display screen to be rotatable able relative to said second portion of said cover about an axis perpendicular to said cover in said open position, and to be slidable relative to said second portion in a plane parallel to said second portion of said cover in said open position;

d) rotating said first portion of said cover and said display screen about said perpendicular axis between said landscape orientation and said portrait orientation; and e) sliding said first portion of said cover and said display screen relative to said second portion of said cover between said landscape orientation and said portrait orientation to selective cover and uncover said speaker ports.

* * * * *

UNITED STATES PATENT AND TRADEMARK OFFICE
CERTIFICATE OF CORRECTION

PATENT NO. : 5,708,561
DATED : January 13, 1998
INVENTOR(S) : VIVEK R. HUILGOL ET AL It is certified that error appears in the above-indentified patent and that said Letters Patent is hereby corrected as shown below:

On title page, item [54] and col. 1, line 4,

In the Title, Cancel "ORIENTATION" insert ---ORIENTATIONS---; Claim 5, Col. 8, Line 9, After "base;" delete "," (comma); Claim 8, Col. 8, Line 27, Cancel "is slidably", second occurrence; Claim 10, Col. 8, Line 34, After "one" insert ---of---; Claim 12, Col. 8, Line 51, After "direction" insert ---,---; Claim 12, Col. 8, Line 56, After "portion" insert ---pivotally---; Claim 12, Col. 8, Line 58, After "and" and before "ports" insert ---speaker---; Claim 12, Col. 8, Line 62, After "rotatable" cancel "able"; Claim 12, Col. 10, Line 2, Cancel "selective" insert ---selectively---

Signed and Sealed this

Twenty-first Day of April, 1998

Attest:

Attesting Officer

BRUCE LEHMAN

Commissioner of Patents and Trademarks